(12) United States Patent
Lintunen

(10) Patent No.: US 9,904,909 B2
(45) Date of Patent: Feb. 27, 2018

(54) CHIPPER MACHINE WEAR PLATE, REPLACEABLE WEAR PLATE CORNER PIECE, AND ANVIL MONITORING

(71) Applicant: Andritz Inc., Glens Falls, NY (US)

(72) Inventor: Timo Lintunen, Alpharetta, GA (US)

(73) Assignee: Andritz Inc., Glens Falls, NY (US)

( * ) Notice: Subject to any disclaimer, the term of this patent is extended or adjusted under 35 U.S.C. 154(b) by 0 days.

(21) Appl. No.: 15/338,517

(22) Filed: Oct. 31, 2016

(65) Prior Publication Data
US 2017/0124532 A1     May 4, 2017

Related U.S. Application Data

(60) Provisional application No. 62/248,353, filed on Oct. 30, 2015, provisional application No. 62/275,540, filed on Jan. 6, 2016.

(51) Int. Cl.
| | |
|---|---|
| *G06F 19/00* | (2011.01) |
| *G06Q 10/00* | (2012.01) |
| *B27L 11/00* | (2006.01) |
| *G06K 19/077* | (2006.01) |
| *G05B 19/4065* | (2006.01) |

(52) U.S. Cl.
CPC ............ *G06Q 10/20* (2013.01); *B27L 11/005* (2013.01); *G05B 19/4065* (2013.01); *G06K 19/07758* (2013.01); *G05B 2219/37245* (2013.01)

(58) Field of Classification Search
USPC .................... 235/385; 241/93; 144/176, 172
See application file for complete search history.

(56) References Cited

U.S. PATENT DOCUMENTS

| | | | | |
|---|---|---|---|---|
| 5,649,578 A | * | 7/1997 | Leguin ................... | B27L 11/02 144/162.1 |
| 2005/0063133 A1 | * | 3/2005 | Mather ................... | F16P 3/145 361/271 |
| 2008/0004798 A1 | * | 1/2008 | Troxler ................ | A01K 15/023 702/187 |
| 2010/0127107 A1 | * | 5/2010 | Grant .................... | B02C 18/184 241/92 |

* cited by examiner

*Primary Examiner* — Ahshik Kim
(74) *Attorney, Agent, or Firm* — Kerri Hochgesang; Robert Joesph Hornung

(57) ABSTRACT

Disclosed herein are methods for utilizing cutting impact force, bearing temperature, and vibration information of a chipper machine, which comprises monitoring cutting forces generated by the knives cutting logs and monitoring the temperature of the bearings and the knives in the chipper machine. The methods may further comprise identifying a series of cutting impact forces and temperatures to indicate the condition of the bearing, and repairing, replacing, or servicing the bearing or the knives based on the value of the impact forces and temperatures measurements.

7 Claims, 5 Drawing Sheets

CHIPPER MACHINE WEAR PLATE, REPLACEABLE WEAR PLATE CORNER PIECE, AND ANVIL MONITORING

CROSS-RELATED APPLICATION

This application claims the benefit of U.S. Provisional Pat. App. No. 62/248,353 filed on Oct. 30, 2015, and U.S. Provisional Pat. App. No. 62/275,540 filed on Jan. 6, 2016, the entirety of which in incorporated herein by reference.

TECHNICAL FIELD

Aspects of the invention relate generally to a method for monitoring chipper machines used to cut wood into smaller pieces, such as wood chips. The chipper machine may be part of a pulp mill where the cut wood pieces, or chips, are converted to pulp for use in the production of paper products. More particularly, the method for monitoring chipper machines may include the monitoring of the condition of bearings, anvils, a wear plate and, where used, a replaceable wear plate corner piece (all of which are commonly referred to as wear components) while the chipper machine is operating. In a chipper machine, a rolling contact bearing is positioned to allow movement of solid material pieces, and the movement in turn allows for pieces to be used to cut wood. The term rolling contact bearing refers to bearings using spherical balls or another type of roller between the stationary and the moving pieces. An anvil may provide a solid hard surface against which wood is cut. The wear plates in a chipper machine, which may include a replaceable wear plate corner piece, are positioned to provide protection for the chipper disc. Similar equipment may be used in the pelletizing industry.

BACKGROUND

Chipper machines are used to cut wood into smaller pieces, such as wood chips ("chips"). Chipper machines come in different sizes according to the needs of the installation where they are used. Chipper facilities are large in area and capable of receiving large amounts of raw material. These facilities are typically the first phase of a pulp mill production process.

The raw material fed to the chipper machine is generally logs or other wood material. Raw material or feed material (for simplicity, the raw material will be referred to as "logs," but could have other shapes) is generally fed continuously into a chipper machine. Chipper machine feed material typically comprises a number of pieces of logs of differing sizes and shapes. Chipper knives ("knives") are used to cut the logs as the logs move through the chipper machine. The bearings for chipper machines are of the rolling contact surface type. An anvil is used to hold the logs during the cutting process. A wear plate, including in many cases a replaceable wear plate corner piece, is used to protect the chipper disc from wood pieces and debris associated with the logs.

To ensure that raw material transferred to equipment downstream of the chipper machine is of high quality, the chipper machines must be outfitted with sharp cutting knives, an appropriate wear plate, a replaceable wear plate corner piece, and appropriate anvils. The equipment downstream of the chipper machine includes mechanical refining or chemical refining equipment, or other processes where the chips from the chipper facility are processed to create pulp. It is important in the pulp processing industry for chipper machines to be available and operational with little down time. Chipper machine down time can result from routine maintenance, replacement of the knives used to cut the logs, from checking and replacing wear parts in the chipper machine, such as the wear plate and the anvil, and the replacement of bearings.

As logs move through the chipper machine, the knives cut the logs into chips. In order to obtain chips of a desired size and shape, the anvil is used to position and hold the logs in place while they are being cut by the knives. While efforts are made to feed only logs to the chipper machines, pieces of rock and other debris may also be fed to the chipper machine with the logs. The cutting of both the logs and the associated rocks and debris causes the knives to become dull and damaged, which in turn can result in a poor quality chip. Poor quality chips, including chips of undesired sizes, adversely impact the quality of the pulp produced by downstream processes.

Bearings may become worn or even damaged through normal operation of the chipper machine. One indication of wear or damage may be the audible sounds of the chipper machine. Abnormal bearing sounds can indicate a problem with the bearing and possibly can indicate the severity of the problem. For example, a clang or clatter sound may indicate bearing deformation. Other sounds and the causes are common. One drawback to using sounds to help determine bearing wear or damage is the subjectivity of sounds between people. Another drawback to using sounds to help determine bearing wear or damage is the high level of sound from a chipper machine under routine operations.

It is also possible to use temperature of the bearing to suggest when operational issues occur due to bearing problems. The use of temperature is limited to comparing a temperature to an upper set point of an acceptable temperature for the bearings. Once the upper set point is reached, the chipper machine must be taken offline, inspected, and repaired or replaced.

Another method which can be used to detect damage to bearings is measuring of the vibration of the machine. When vibration measurement is used to detect damage, one must rely on the amplitude and frequency of the vibration to indicate damage to the bearing. The downside of using vibration measurement to detect damage is the values measured differ depending on the operating condition of the bearing and the measuring point of the vibration. As with the previously mentioned possible monitoring practices, the data received is to distinguish problems from normal operations.

Currently, the temperature of the bearing is measured by a sensor. The temperature reading is sent to a computer where the sensed temperature is compared to a maximum allowed temperature. If the sensed temperature is below the maximum allowed temperature, no change is made to the operations. If the sensed temperature is above the maximum allowed temperature, the chipper machine operation is halted, and the chipper machine is inspected and repaired. The current practice is an "on/off" type operation, meaning the chipper machine is either on or the chipper machine is off.

The anvil used to hold the logs may also become damaged and worn by the constant operation of the chipper machine. Also, in addition to the logs and associated rocks and debris comprising the chipper machine feed material, pieces of the knives that have become broken during the cutting of the feed material may hit and damage the anvil. Because poor quality chips may be a result of multiple causes, such as the logs themselves, worn or damaged cutting knives, or anvil wear or damage, the quality of the chips cannot be used to definitively determine whether or not the anvil is worn or damaged. If damage to the anvil is suspected, in conventional applications, the chipper machine must be stopped and the anvil visually inspected. Such inspections may cause unscheduled down time for the chipper machine.

Another part which can become worn for many of the same reasons as the anvil is a wear plate. The wear plate, which may include a replaceable wear plate corner piece bolted to the wear plate, is positioned to protect the chipper disc. As with the anvil, the wear plate, and if present the replaceable wear plate corner piece, may become damaged by the logs, the associated debris fed with the logs, pieces of metal broken off from the cutting knives, or even by the anvil. As previously stated, the quality of the chips may not be an indication of wear or damage to the anvil, the wear plate, or the replaceable wear plate corner piece.

When the anvil, wear plate, or replaceable wear plate corner piece become damaged or worn, an increase in cutting forces exists. As the cutting forces increase, more wear or damage to the wear plate, replaceable wear plate corner piece, and/or anvil may occur. As the wear plate, replaceable wear plate corner piece, and/or anvil become damaged, chip quality suffers. While wear or damage to the wear plate, replaceable wear plate corner piece, or the anvil may cause poor chip quality, other causes of poor chip quality not related to the wear plate, replaceable wear plate corner piece, and the anvil may exist.

There is a long felt need to establish a method to remotely monitor the condition of an anvil, a wear plate, and, when present, a replaceable wear plate corner piece to determine when these parts are damaged or worn and should be replaced. For the bearings, remote monitoring of its condition may involve temperature and vibration and/or force measurements. Such remote monitoring would allow for reduced down time for visual inspection of the anvil, wear plate, or wear replaceable plate corner piece. In the case of bearings, the monitoring based on temperature, vibration and forces may provide information regarding conditions of the bearings and when to schedule inspections and replacement.

SUMMARY OF INVENTION

In the present disclosure bearings are positioned in the chipper machine to allow the movement of pieces required for cutting of the wood. In the present disclosure, both temperature and vibration or force will be measured for the bearings. It is anticipated, multiple, at least two, sensors may be used for temperature and vibration or force measurement. The sensors may be located at the bearing house or anvil. One sensor may be taken and compared to the maximum allowed temperature (as is currently done) and a second sensor will measure temperature of the bearings and be sent to a computer where temperature data, along with the vibration or force data, will be gathered and analyzed to identify the combination of temperature and vibration or forces indicating specific problems with the bearings. The measurements will be collected continuously. As temperature and vibration or force data are collected and analyzed, it may be possible to establish combinations of temperature and vibration or force information signaling a specific bearing problem. Such problems may include, but are not be limited to, too little lubricant, too much lubricant, different lubricant needed for specific operations, physical damage to the bearing, balance issues, and disc damage.

Another use for the monitoring of bearing temperature and vibration or force may be to establish a percentage of wear for specific temperature and vibration and/or force combinations. By establishing the wear percentage without physical inspection, maintenance downtime for bearing inspection and replacement may be scheduled to coincide with down times for other maintenance on the chipper machine. If physical inspection is not required, a maintenance downtime for reasons unrelated to the bearing condition may be reduced in length thereby making the chipper machine available for operation and reducing manpower maintenance time and costs.

Continuous measurement and monitoring of the temperature and vibration or force sensor information allows improved control of operations and allows for better scheduling of downtime for inspection and repair. For example, if the bearing temperature changes rapidly (several degrees per second) this might suggest a problem is developing. Upon indication of a problem developing, a controlled shutdown of the chipper machine may be accomplished prior to the bearing temperature exceeding the maximum allowed temperature. A controlled shutdown of the chipper machine improves both safety of operations and equipment (machine) overall wear.

Another advantageous use of the information from the continuous measurement and monitoring of the bearing temperature and vibration or force is to compare bearing temperatures between cold starts of the chipper machine. By comparing the bearing temperatures between cold starts, bearing wear indications can be obtained.

As a result of continuous gathering of bearing temperature and vibration and/or force information, it may be possible to extend the runtime operations between routine maintenance by reviewing the temperature and vibration and/or force data and establishing specific temperature and vibration and/or force combinations signaling what kind of maintenance is required. One combination of temperature and vibration and/or force may indicate a specific equipment problem requiring bearing replacement, while a second temperature and vibration and/or force combination may indicate bearing lubrication is required but not the replacement of bearings. By having prior knowledge of the specific parts of the chipper machine requiring maintenance, downtime and costs can be better controlled and limited exposure of manpower to equipment handling may improve safety in the facility.

In this disclosure is also a method useful for the tracking of equipment. An "identification tag," for example a radio frequency identification tag, may be placed on equipment at the time of installation or inspection or repair or rebuild. The identification tag may contain information such as, but not limited to, date of installation, date of inspection, date of maintenance, reports and results of inspections, repairs made, and item number. Once in place, the identification tag can be accessed by any suitable device and data regarding the equipment can be stored such that it can be accessed electronically and maintained as desired.

In the present disclosure, an anvil is positioned within a chipper machine to provide a solid surface against which the log is cut. A wear plate is positioned diagonally across from the anvil and across from the knife. A replaceable wear plate corner piece, if used, is bolted to the wear plate at the corner facing both the anvil and the knife. There exists a gap between the knife and anvil, which typically measures 0.6 to 0.8 mm. An opening measures "T," which is the distance between the tip of the knife and the edge of the wear plate or replaceable wear plate corner piece. The opening measurement "T" is determined to be advantageous to produce the desired chip size, and typically measures 11 to 13 mm. As previously noted, poor quality chips can result for multiple reasons, for example, a worn or damaged anvil, a worn or damaged wear plate, or a worn or damaged replaceable wear plate corner piece.

Cutting forces are influenced by a combination of multiple variables. The most important variables include: the condition of the knives, the knife angle, the gap (the distance between the knife and the anvil), the condition of the wear plate, the condition of the replaceable wear plate corner piece, "T," the raw material being used, and the quantity of chips to be produced.

A process has been proposed using at least one sensor on the knives of the chipper machine to monitor the cutting impact or cutting force ("cutting impact force") caused by a knife cutting the logs. This process is described in WO2015/075305, the entirety of which is included herein by reference. It is proposed to use the cutting impact force information gathered by sensors to determine when a wear plate, replaceable wear plate corner piece, or anvil has been damaged or has become worn to the point where the wear plate, replaceable wear plate corner piece, and/or anvil are the reason for poor chip quality.

Cutting knives tend to be the most frequently worn or damaged part of a chipping machine. The process described in WO 2015/075305 determines the need for replacement of the cutting knives from information obtained by the sensors. What has now been determined is that the knife cutting impact force information can be used to evaluate the condition of the wear plate, replaceable wear plate corner piece, and anvil.

As described in WO 2015/075305, in the case of the knives, cutting impact force information was gathered and monitored continuously. As the cutting impact force information was monitored throughout a cutting cycle, changes in the cutting impact forces were noted and compared between revolutions of the knives. When the cutting impact forces become a pre-determined set point, the knife quality is determined to be poor. When the quality of the knives is determined to be "poor," then the knives should be replaced.

For determining the wear or damage to the wear plate, replaceable wear plate corner piece, or the anvil, the cutting impact force information from the sensors must be considered in another exemplary method. Benchmark information on cutting impact forces when all parts (knives, wear plate, replaceable wear plate corner pieces, and anvil) are new is gathered. Different wear parts (like the knives, wear plate, replaceable wear plate corner pieces, and anvil) have different wear trend and wear life. Cutting knives tend to wear the most quickly, with required knife replacements in a matter of days or even hours. Anvils usually are replaced every two to four weeks. Replaceable wear plate corner pieces may require replacement every few months, while wear plates may require replacement only about every nine months. The wear trend for each wear part is different, and each wear part contributes differently to the cutting impact force.

Once cutting impact force information is compiled, the wear trends will become apparent. When benchmark cutting impact force data has been gathered, it is stored and available for comparison to cutting impact force information gathered during chipper machine operation. When the cutting impact force information exhibits a pre-determined trend, the wear part responsible for that trend is identified and designated for replacement.

When the chipper machine is started with new wear parts, the cutting impact forces measured are at their lowest (smallest) readings. As use of the chipper machine continues, the knife to anvil relationship changes. For example, if the knife is new and the anvil has not been replaced, the surface of the anvil may take on a different shape causing the gap between the knife and the anvil to become larger. In such cases, the logs are supported at a point further from the knife tip, and the cutting impact forces are higher.

When the wear plate and the replaceable wear plate corner piece are new, they have sharp edges. The corner of the wear plate closest to the knife tip is sharp and distinct. If the wear plate has not been replaced, but the knife piece and the anvil are new, the corner of the wear plate closest to the knife tip becomes worn and distorted from its sharp corner condition, and the size of the chips produced by the cutting of the logs may change and become unsatisfactory.

If a wear plate has a replaceable wear plate corner piece, the replaceable wear plate corner piece, when new, has sharp edges. As the replaceable wear plate corner piece, specifically the corner closest to the knife tip, becomes worn, it may become distorted from its sharp corner condition. Should such distortion occur, the size of the opening measurement "T" may change from the desired setting, the result is chips having an unsatisfactory size or shape.

For wear plate, replaceable wear plate corner piece, and anvil monitoring, cutting impact force information is gathered for the first few minutes (for example 3 minutes to 10 minutes, or 4 minutes to 8 minutes, or 5 minutes to 7 minutes) after the startup of subsequent new knife changes. The average cutting impact force for the new knife cutting impact force will be taken as the average cutting impact force measured during the first few minutes of a new knife run. When a new set of knives is used, following the benchmark operations, the new set of knives is given a unique case number. Associated with each unique case number is an average cutting impact force.

Using the unique case number and its associated average cutting impact force, a plot of the unique case number and its associated average cutting impact force gives an indication of the change in cutting impact force over time. When the average cutting impact force reaches a pre-determined point, the pre-determined point being higher than the benchmark point, the chipper machine is stopped and the anvil, wear plate, and replaceable wear plate corner piece are inspected. Any worn part is replaced and the chipper can be returned to operation.

If only one wear part, such as only the anvil, is replaced, the data of a unique case number and the average cutting impact force is continued to be gathered and plotted. The average cutting impact force will drop after replacing a worn wear part (anvil for example), but may not return to the benchmark, or even near the benchmark, but is likely to improve over the cutting impact force just prior to the replacement of the wear part. By continuing to plot the unique case number and the average cutting impact force one can begin to predict the condition of the wear parts. Timing of maintenance can be better predicted, thereby allowing for the replacement of wear parts in a timely manner and thus reducing chip quality variations. By reducing chip quality variations, pulp quality is improved.

DETAILED DESCRIPTION OF THE DRAWINGS

The following detailed description of the drawings is presented only for illustrative and descriptive purposes and is not intended to be exhaustive or to limit the scope and spirit of the conceived method. The drawings were selected and described to best explain the principles of the conceived method and its practical application. A person of ordinary skill in the art will recognize many variations can be made to the conceived method disclosed in this specification without departing from the scope and spirit of the conceived system. In all drawings, the same or compatible parts have the same reference number where possible.

Figure 1:
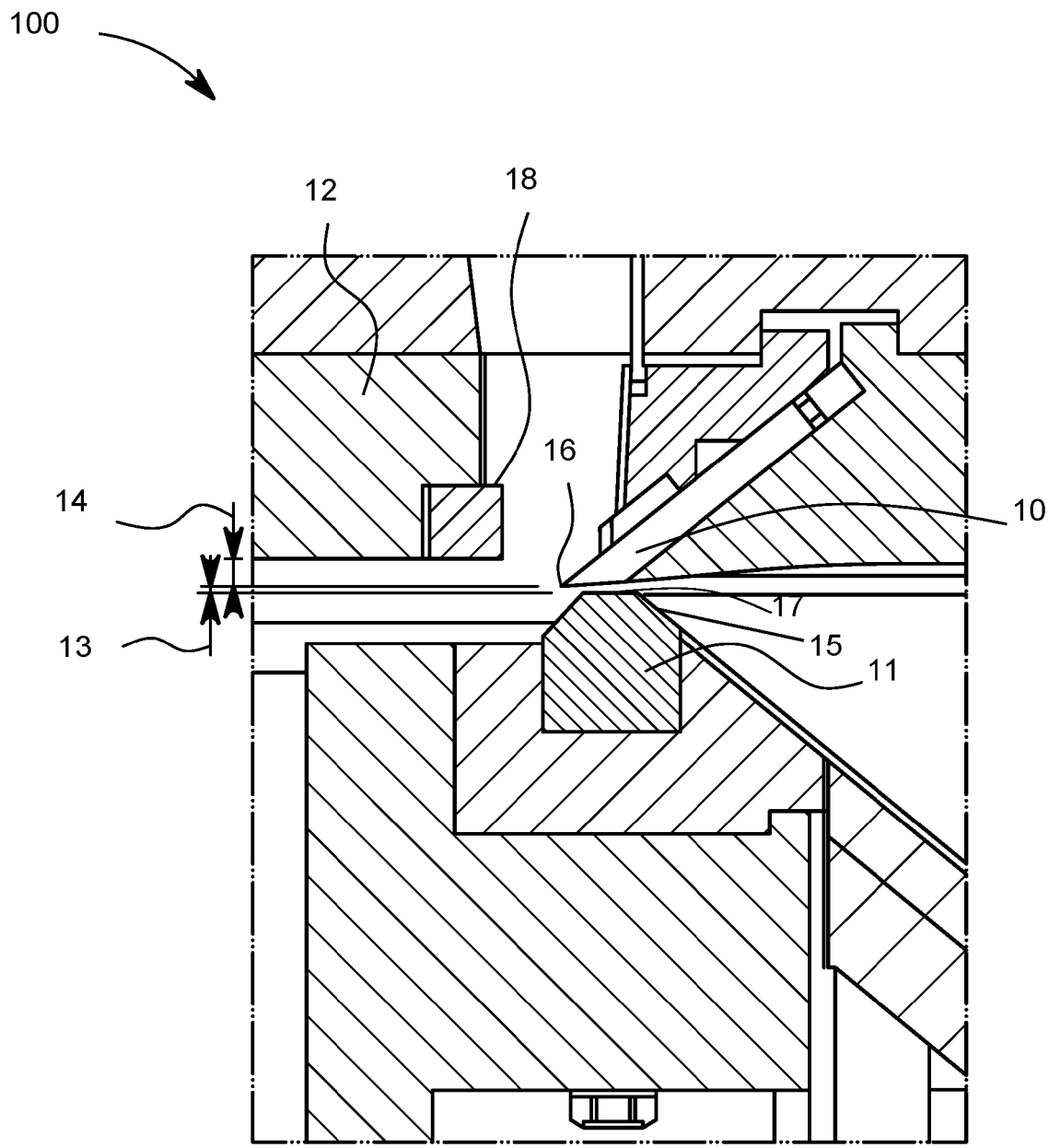
FIG. 1 is a cut-away view of the chipper machine with new (previously unused) wear parts in a conventional chipper machine.

FIG. 1 shows a cutaway view of a chipper machine 100 showing the physical relationship of the knife 10, the wear plate 12, and the anvil 11. Also identified in this figure are: the anvil angled side surface 15, the knife tip 16, the anvil top surface 17, the gap 13 (gap 13 is the distance between the anvil top surface 17 and the knife tip 16), and measurement T 14 (measurement T 14 is the distance between the knife tip 16 and the replaceable wear plate corner piece 18). The importance and function of these will become clear in the following description.

Measurement T 14 is set to obtain the desired chip size and shape. A consistent chip size and shape is important ultimately to the quality of the pulp. Downstream pulping equipment is designed and operated based on a consistent chip size and shape. As the chip size and shape changes, the pulp quality is impacted. If the size of the chip increases, or the shape changes, the downstream equipment may not completely process the chip or may have difficulty processing the chip and require additional energy, chemicals, etc. Having a consistent, predictable measurement T 14 reduces the likelihood of size and shape changes to the chips over time.

The smallest or lowest cutting impact forces occur when a chipper machine starts up with new (previously unused) knives 10, a new (previously unused) anvil 11, and a new (previously unused) wear plate 12, and/or a new (previously unused) replaceable wear plate corner piece 18. This is the time when the knife 10 is closest to the anvil 11. The anvil 11 is positioned to hold the log while it is being cut. The gap 13 is selected to help align the log and the knife tip 16 so that the anvil can position the log close to the knife tip 16. Having a consistent and predictable gap 13 helps to reduce the cutting impact forces, and thereby helps to provide for a consistently sized and shaped chip.

Figure 2:
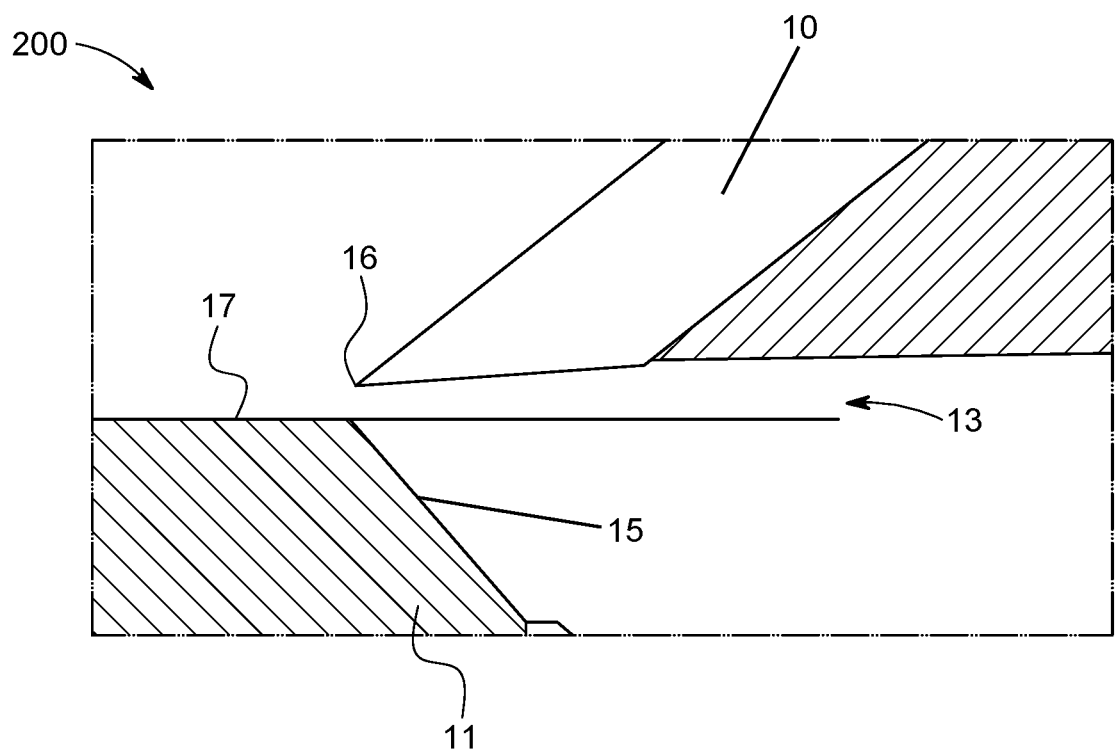
FIG. 2 is a close-up view of a knife tip and anvil in new condition.

FIG. 2 shows a close-up of the chipper machine 200 allowing details to be seen of the knife 10, the gap 13, the knife tip 16, the anvil 11, the anvil top surface 17, and the anvil side surface 15. Chipper machine 200 details the relationship between the knife 10 and anvil 11 when both parts are new. When new, the anvil top surface 17 has a sharp edge, as does the anvil side surface 15. Also having sharp edges is knife 10, especially near the knife tip 16.

Figure 3:
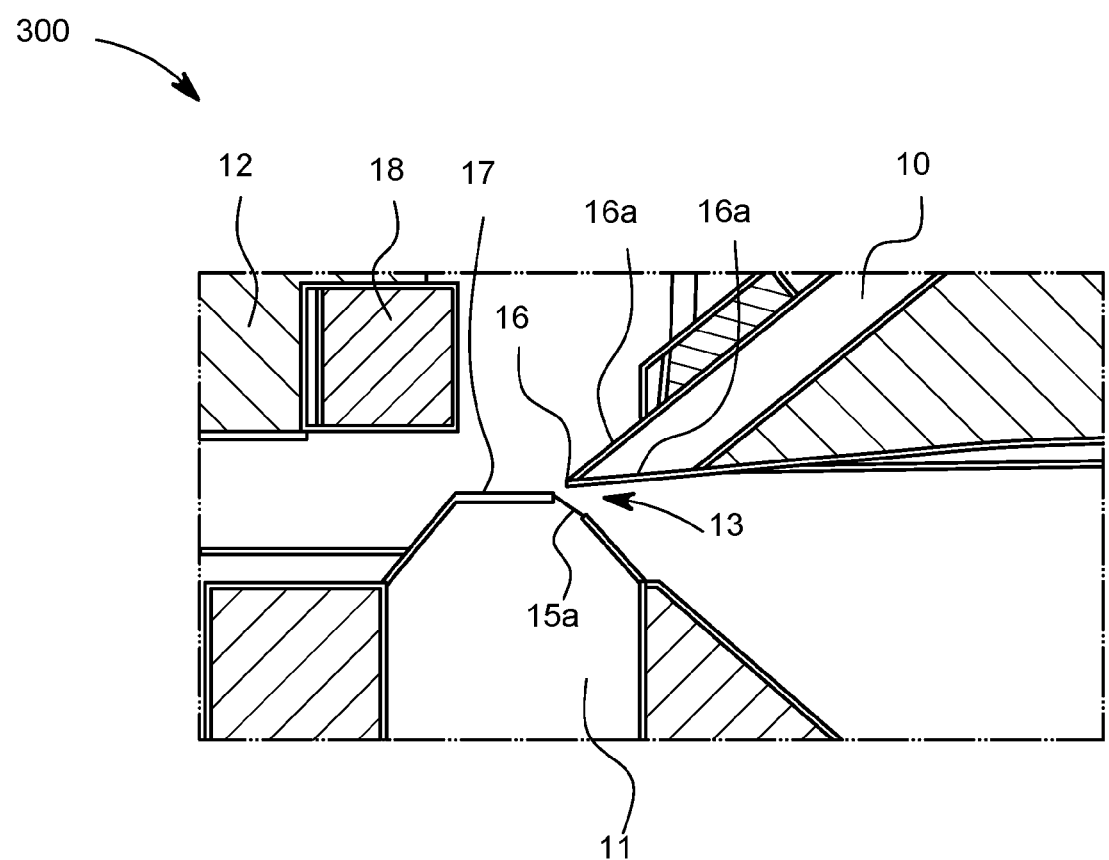
FIG. 3 is a close-up view of a knife tip in new condition and an anvil in worn condition.

FIG. 3 shows a close-up of the chipper machine 300, focusing on details showing the anvil 11 having become worn. Chipper machine 300 has a knife 10, with a knife tip 16. The knife tip 16 is formed when sharp knife edges 16a exist. Shown in FIG. 3 is a worn anvil angled side surface 15a. The worn anvil angled side surface 15a becomes slightly rounded or uneven as it becomes damaged or worn. This results in the gap 13 becoming less distinct and greater is size, causing the logs to become poorly positioned and resulting in unsatisfactorily sized and shaped chips being produced by chipper machine 300. Other surfaces of the anvil 11, specifically the anvil top surface 17, may also become worn or damaged. Such wear and damage has the same impact on the logs and results in unsatisfactory chips being produced. In FIG. 3, a wear plate 12 is shown with a replaceable wear plate corner piece 18 attached (attachment may be via bolts, not shown, or any suitable attaching mechanism) to a wear plate 12. In this embodiment, the wear plate 12 and the replaceable wear plate corner piece 18 are shown as new.

Figure 4:
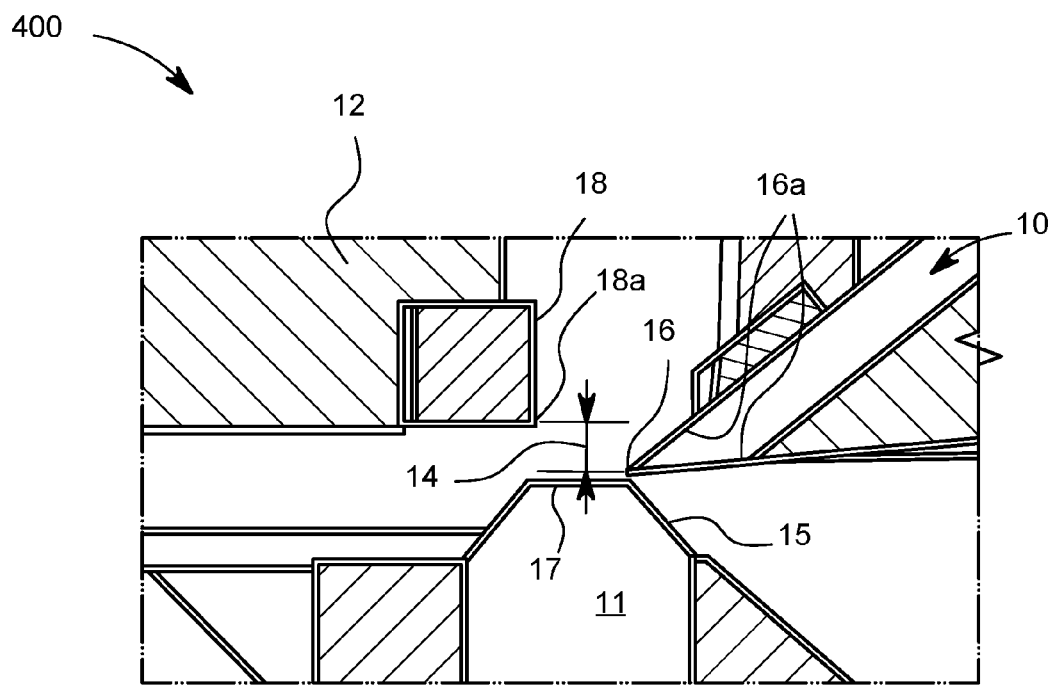
FIG. 4 is a close-up view of a knife tip, wear plate, and anvil in new condition.

FIG. 4 shows a close-up of the chipper machine 400, detailing the knife 10, the measurement T 14, the knife tip 16, the anvil 11, the anvil top surface 17, the anvil side surface 15, the wear plate 12, the replaceable wear plate corner piece 18, and the sharp distinct corner 18a of the replaceable wear plate corner piece 18. In this embodiment, a replaceable wear plate corner piece 18 is attached to the wear plate 12.

Chipper machine 400 details the relationships between the knife 10, the wear plate 12, and replaceable wear plate corner piece 18 when the parts are new. When new, the wear plate 12 with the attached replaceable wear plate corner piece 18 has a sharp distinct corner 18a. Also having sharp edges is knife 10, especially near the knife tip 16. A smooth continuous space, measurement T 14, is present. Measurement T 14 is the distance between the knife tip 16 and the corner 18a. When the measurement T 14 is formed by a replaceable wear plate corner piece 18 having a sharp distinct corner 18a and a knife tip 16 with sharp knife edges 16a, the measurement T 14 is set to the desired opening size. This configuration results in the wear plate 12 and the replaceable wear plate corner piece 18 providing the most protection for the chipper disc and providing the desired chips.

Figure 5:
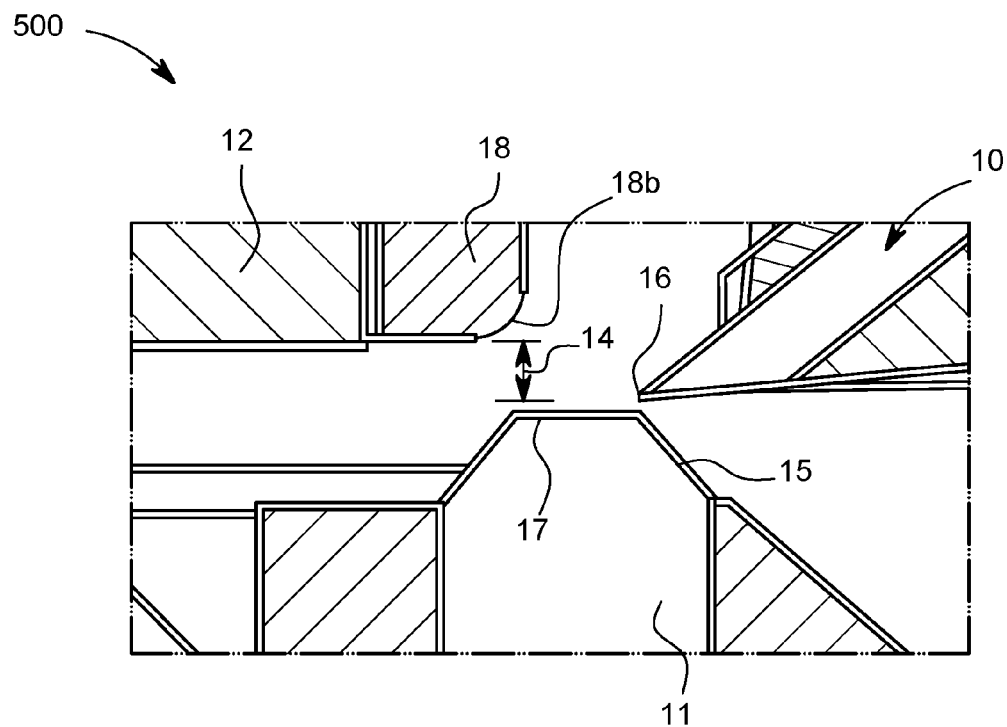
FIG. 5 is a close-up view of a knife tip and an anvil in new condition and a wear plate in worn condition.

FIG. 5 details a close-up of the chipper machine 500 focusing on the wear plate 12 with a worn replaceable wear plate corner piece 18. In this embodiment, as in the embodiment of FIG. 4, the wear plate 12 has an attached replaceable wear plate corner piece 18. Chipper machine 500 has a knife 10, with a knife tip 16. The knife tip 16 is formed where sharp knife edges 16a intersect.

FIG. 5 shows a worn corner 18b for the replaceable wear plate corner piece 18. The worn corner 18b becomes slightly rounded or uneven as it becomes damaged or worn. This results in the measurement T 14 becoming less distinct and greater in size, causing the opening to the chipper disc to be larger and reducing the protection given to the chipper disc by the wear plate 12 and the attached replaceable wear plate corner piece 18. In FIG. 5, anvil 11 is shown as not worn.

In embodiments having a wear plate with an attached replaceable wear plate corner piece, the wear plate itself may become worn or damaged. Worn or damaged wear plates may be replaced with or without the need to replace the replaceable wear plate corner piece.

In some embodiments, the wear plate may be a single piece, for example, no replaceable wear plate corner piece is present. When a single wear plate piece is used, the corner facing the knife will become worn. In these cases, the single wear plate piece will be replaced.

Figure 6:
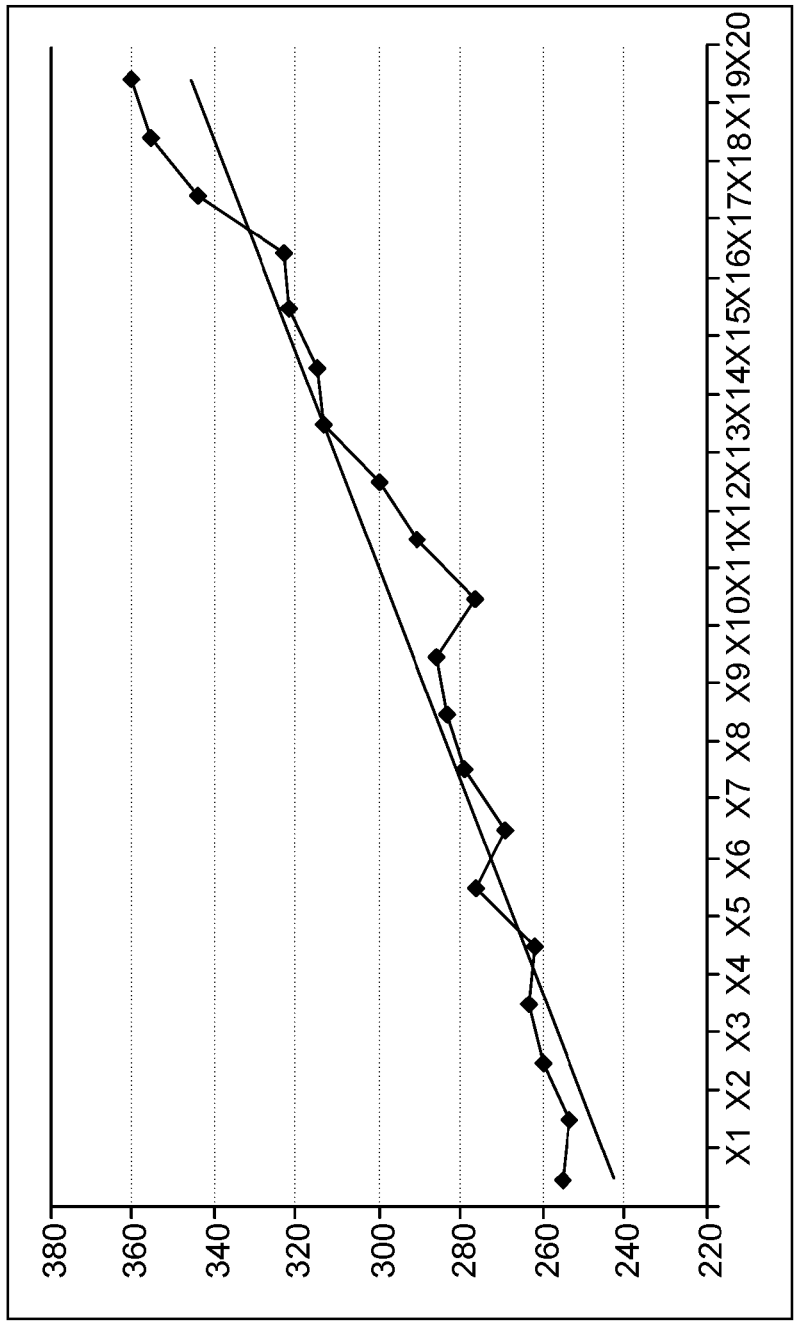
FIG. 6 is a Graphical representation of cycle number versus average knife cutting force.

FIG. 6 shows graphically the relationship between the cutting force and the condition of wear parts. The wear parts can be associated with the cycle number. The cycle X1 is the cycle where all wear parts (including knives) are new. The lowest average cutting force is realized when all wear parts are new. As the chipper machine operates, parts begin to wear and the cutting forces increase.

Typically the first wear part to be replaced is the knife. Once the knife is replaced, a second cycle begins and is identified as X2. As the cutting cycles progresses (a cutting cycle is a period of time between the installation and the replacement or change of a wear part), more wear parts become worn or damaged and the cutting forces become greater. When a wear part is replaced or changed, the cutting force for the next cycle may be lower than the previous cycle.

As data is accumulated for cycles, and the cutting forces before and after replacing a specific wear part are obtained, specific set points for the cutting force can be determined to indicate when a specific wear part is worn or damaged and requires replacement or change. For example, a cutting force set point can be identified, suggesting the replacement of the anvil is required, while not requiring the replacement of the single wear plate or replaceable wear plate corner piece.

Similar data is accumulated for temperature and vibration. By plotting and analyzing the data for temperature and vibration along with the force data, the condition of an individual wear part may be determined and replacement or repair scheduled rather than requiring the chipper machine to be removed from service between scheduled shutdown periods. When repairs or replacement of parts are completed during a scheduled chipper machine down time, the chipper machine is subjected to fewer sudden shutdowns, thereby improving overall run time and providing for safer operation of the chipper machine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for utilizing cutting impact force information produced by a chipper machine, wherein the chipper machine comprises:
   a rotational chipper disc having a plurality of knives;
   multiple wear parts including an anvil and a wear plate, wherein the anvil is positioned to hold a log in place against the plurality of knives, and wherein the wear plate is positioned to protect the chipper disc;
   wherein the method comprises:
      monitoring cutting forces created by the plurality of knives cutting the logs;
   identifying a series of cutting impact force set points, wherein each of the knives, the anvil, and the wear plate have an associated cutting impact force set point indicating the condition of the wear part; and
      replacing wear parts when the specific associated cutting impact force set point is reached.

2. The method of claim 1, wherein the wear plate is a single piece.

3. The method of claim 1, wherein the wear plate includes a replaceable wear plate corner piece.

4. The method of claim 3, wherein the replaceable wear plate corner piece is attached to the wear plate by a fastener such as a bolt.

5. A method for utilizing cutting impact force, bearing temperature, and vibration information produced by a chipper machine, wherein the chipper machine comprises;
   a bearing to allow for movement of pieces;
   a rotational chipper disc having a plurality of knives;
   multiple wear parts including an anvil and a wear plate, wherein the anvil is positioned to provide a solid surface against which a log is cut by the plurality of knives, and wherein the wear plate is positioned to protect the chipper disc, and force, temperature, and vibration sensing equipment;
   wherein the method comprises:
      monitoring cutting forces created by the plurality of knives cutting the logs; monitoring the temperature of the bearing;
      identifying a series of cutting impact force set points and temperature measurements, wherein bearings have a specific cutting impact force set point and wherein the temperature measurement indicates the condition of the bearing, and
      taking an action corresponding to the impact force set point and temperature measurement selected from the group consisting of: repairing, replacing, or servicing the bearing or the knives.

6. The method for utilizing cutting impact force, bearing temperature, and vibration information produced by a chipper machine of claim 5, wherein the sensing equipment is located on the bearing housing.

7. The method for utilizing cutting impact force, bearing temperature, and vibration information produced by a chipper machine of claim 5, wherein the sensing equipment is located on the anvil.

* * * * *